(12) United States Patent
Wang et al.

(10) Patent No.: US 7,444,343 B2
(45) Date of Patent: Oct. 28, 2008

(54) HYBRID LOCATION AND KEYWORD INDEX

(75) Inventors: Chuang Wang, Wuhan (CN); Wei-Ying Ma, Beijing (CN); Xing Xie, Beijing (CN); Yinghua Zhou, Beijing (CN)

(73) Assignee: Microsoft Corporation, Redmond, WA (US)

( * ) Notice: Subject to any disclaimer, the term of this patent is extended or adjusted under 35 U.S.C. 154(b) by 178 days.

(21) Appl. No.: 11/278,301

(22) Filed: Mar. 31, 2006

(65) Prior Publication Data

US 2007/0233649 A1   Oct. 4, 2007

(51) Int. Cl.
*G06F 17/00* (2006.01)
*G06F 17/30* (2006.01)

(52) U.S. Cl. .................... 707/100; 707/1; 707/3; 707/104.1

(58) Field of Classification Search .......... 707/3, 707/104.1, 1, 100
See application file for complete search history.

(56) References Cited

U.S. PATENT DOCUMENTS

| | | | |
|---|---|---|---|
| 6,286,002 B1 * | 9/2001 | Axaopoulos et al. | 707/10 |
| 6,334,131 B2 * | 12/2001 | Chakrabarti et al. | 707/10 |
| 6,356,899 B1 * | 3/2002 | Chakrabarti et al. | 707/5 |
| 6,418,433 B1 * | 7/2002 | Chakrabarti et al. | 707/5 |
| 6,505,205 B1 * | 1/2003 | Kothuri et al. | 707/100 |
| 6,879,980 B1 * | 4/2005 | Kothuri et al. | 707/5 |
| 7,089,239 B1 * | 8/2006 | Baer et al. | 707/6 |
| 2002/0151315 A1 * | 10/2002 | Hendrey | 455/466 |
| 2002/0169784 A1 * | 11/2002 | Cha et al. | 707/102 |
| 2002/0188581 A1 * | 12/2002 | Fortin et al. | 706/20 |
| 2003/0004938 A1 * | 1/2003 | Lawder | 707/3 |
| 2005/0137994 A1 * | 6/2005 | Fortin et al. | 706/45 |
| 2005/0177455 A1 * | 8/2005 | De Lury et al. | 705/26 |
| 2005/0177554 A1 * | 8/2005 | Peltonen et al. | 707/3 |
| 2005/0198014 A1 * | 9/2005 | De Lury et al. | 707/3 |

(Continued)

OTHER PUBLICATIONS

Beckmann, N. et al., "The R-tree: An Efficient and Robust Access Method for Points and Rectangles," In Proceedings of the 1990 ACM SIGMOD International Conference on Management of Data (SIGMOD 1990), Atlantic City, NJ, 1990, 322-331.

(Continued)

*Primary Examiner*—Don Wong
*Assistant Examiner*—Thanh-Ha Dang
(74) *Attorney, Agent, or Firm*—Perkins Coie LLP

(57) ABSTRACT

A method and system for generating a hybrid index for indexing objects based on location and keyword attributes and performing location-based searching is provided. A search system performs a location-based search using a hybrid index that indexes both location and keyword attributes of objects. The search system generates the hybrid index either using the location attribute as the primary index or the keyword attribute as the primary index. When the location attribute is the primary index, the keyword attribute is the secondary index, and vice versa. To generate the hybrid index, the search system identifies the values for the keyword and location attributes of each object. The search system generates the primary index to map each value of a first attribute to a secondary index. The search system thus generates, for each value of the first attribute, a secondary index to map values of a second attribute to objects that have the associated values of the first and second attributes. The search system then uses the hybrid index to perform location-based searching.

16 Claims, 8 Drawing Sheets

U.S. PATENT DOCUMENTS

| | | | |
|---|---|---|---|
| 2006/0190425 A1* | 8/2006 | Chang et al. | 707/2 |
| 2006/0282455 A1* | 12/2006 | Lee et al. | 707/102 |
| 2007/0168465 A1* | 7/2007 | Toppenberg et al. | 709/218 |
| 2007/0233864 A1 | 10/2007 | Xie et al. | |
| 2007/0288437 A1* | 12/2007 | Xia | 707/3 |
| 2008/0052151 A1 | 2/2008 | Xie et al. | |
| 2008/0052413 A1 | 2/2008 | Wang et al. | |

OTHER PUBLICATIONS

Lee, R. et al., "Optimization of Geographic Area to a Web Page for Two-Dimensional Range Query Processing," In Proceedings of Fourth International Conference on Web Information Systems Engineering Workshops (WISEW 2003), © 2004 IEEE.

Markowetz, A. et al., "Design and Implementation of a Geographic Search Engine," Eighth International Workshop on the Web and Databases (WebDB 2005), Jun. 16-17, 2005, Baltimore, Maryland.

Wang, C. et al., "Detecting Geographic Locations from Web Resources," The 2nd International Workshop on Geographic Information Retrieval (GIR 2005), Nov. 4, 2005, Bremen, Germany, pp. 17-24.

* cited by examiner

HYBRID LOCATION AND KEYWORD INDEX

BACKGROUND

Many search engine services, such as Google and Overture, provide for searching for information that is accessible via the Internet. These search engine services allow users to search for display pages, such as web pages, that may be of interest to users. After a user submits a search request (i.e., a query) that includes search terms, the search engine service identifies web pages that may be related to those search terms. To quickly identify related web pages, the search engine services may maintain a mapping of keywords to web pages. This mapping may be generated by "crawling" the web (i.e., the World Wide Web) to identify the keywords of each web page. To crawl the web, a search engine service may use a list of root web pages to identify all web pages that are accessible through those root web pages. The keywords of any particular web page can be identified using various well-known information retrieval techniques, such as identifying the words of a headline, the words supplied in the metadata of the web page, the words that are highlighted, and so on. The search engine service identifies web pages that may be related to the search request based on how well the keywords of a web page match the words of the query. The search engine service then displays to the user links to the identified web pages in an order that is based on a ranking that may be determined by their relevance to the query, popularity, importance, and/or some other measure.

Some search engine services attempt to tailor the search result based on the location of the user or other location information provided by the user. These search engine services are referred to as "location-based" search engine services. A location-based search engine service may allow a user to specify a query location along with query terms. A location-based search engine service could treat the query location just like another query term and use a traditional search engine service to search for related web pages. Alternatively, a location-based search engine service may first perform a traditional search using the query terms and then rank the search results based on the query location. For example, a user looking for a restaurant may enter the query location of "Redmond" and the query terms of "Chinese restaurant." The search engine service would search for Chinese restaurants and then rank web pages, if any, that include the word Redmond higher than those that do not. Such location-based search engines, however, cannot support advanced spatial queries. An advanced spatial query may specify distance such as "within 5 kilometers of my current location," may specify relation to governmental organizations such as "within King County" and "encompasses King County," and so on.

Many location-based web applications, including location-based search engine services, have been developed to support mobile devices and local searching needs. Such location-based web applications include navigation systems, local advertisement systems, geographic retrieval systems, and so on. These web applications need to detect the locations of a web resource and match it with the user's current location. For example, a cellular phone user may want to find a local car dealership. A web application could match the user's current location as indicated by the cellular phone with the location of car dealers to identify which car dealerships may be appropriate to suggest to the user. To provide accurate results, these web applications need to identify the locations associated with a web page and the meaning of the location. Location may be categorized as a provider location, a content location, and a serving location. A provider location identifies the geographic location of the entity that provides the web resource. A content location identifies the geographic location that is the subject of the web resource. A serving location identifies the geographic scope that the web page reaches.

These web applications need to perform accurate location-based searching in real time to support their functions. For example, an appropriate location-based advertisement needs to be identified and presented to a user at the same time the search result is presented to the user. Current techniques for locating web resources, however, are either too slow to operate in real time or so inaccurate that their results are not particularly satisfactory.

SUMMARY

A method and system for generating a hybrid index for indexing objects based on location and keyword attributes and performing location-based searching is provided. A search system performs a location-based search using a hybrid index that indexes both location and keyword attributes of objects. The search system generates the hybrid index either using the location attribute as the primary index or the keyword attribute as the primary index. When the location attribute is the primary index, the keyword attribute is the secondary index, and vice versa. To generate the hybrid index, the search system identifies the values for the keyword and location attributes of each object. Each object may have multiple locations represented by a set of locations. The search system generates the primary index to map each value of a first attribute to a secondary index. The search system thus generates, for each value of the first attribute, a secondary index to map values of a second attribute to objects that have the associated values of the first and second attributes. The search system then uses the hybrid index to perform location-based searching. A location-based query includes a query location and a query term. To generate the search result, the search system searches the primary index using the query value for the first attribute to locate the associated secondary index. The search system then searches the associated secondary index for the query value of the second attribute to identify the objects associated with both the query values of the first attribute and the second attribute. The search system then returns the identified objects as the search result.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
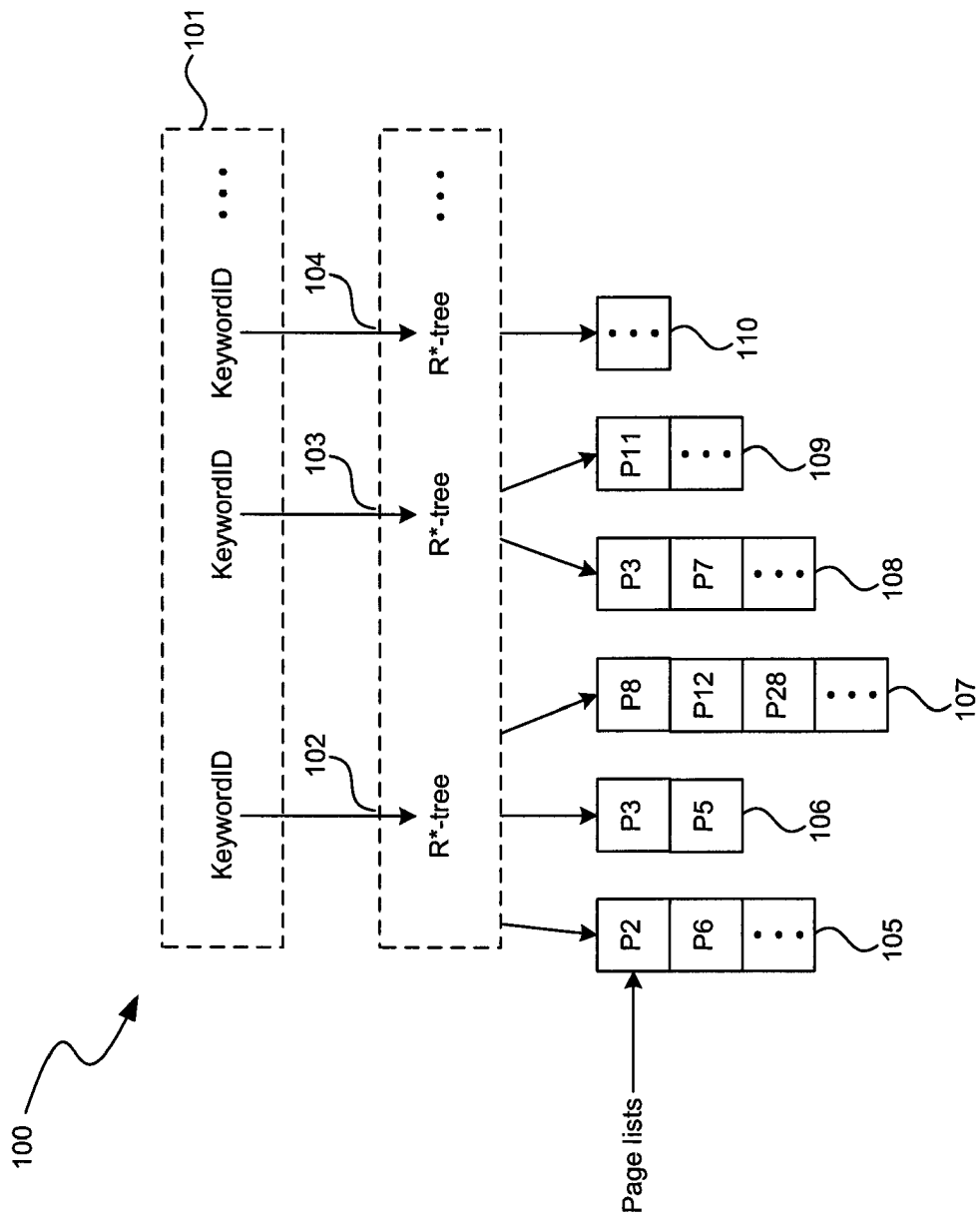
FIG. 1 is a block diagram that illustrates a hybrid index with a keyword index as the primary index in one embodiment.

A method and system for generating a hybrid index for indexing objects based on location and keyword attributes and performing location-based searching is provided. In one embodiment, a search system performs a location-based search using a hybrid index that indexes both location and keyword attributes of objects (e.g., web pages and advertisements). The search system generates the hybrid index either using the location attribute as the primary index or the keyword attribute as the primary index. When the location attribute is the primary index, the keyword attribute is the secondary index, and vice versa. To generate the hybrid index, the search system identifies the values for the keyword and location attributes of each object. For example, when the object is a web page, the search system may identify the keywords and location names from the content of the web page. The search system may map the location names to vector-based locations, which are used for indexing. The search system may represent each mapped-to location as a rectangular area identified by coordinates of its diagonal corners. Each object may have multiple locations represented by a set of locations. The search system generates the primary index to map each value of a first attribute to a secondary index. The search system thus generates, for each value of the first attribute, a secondary index to map values of a second attribute to objects that have the associated values of the first and second attributes. The search system then uses the hybrid index to perform location-based searching. A location-based query includes a query location and a query term. To generate the search result, the search system searches the primary index using the query value for the first attribute to locate the associated secondary index. The search system then searches the associated secondary index for the query value of the second attribute to identify the objects associated with both the query values of the first attribute and the second attribute. The search system then returns the identified objects as the search result.

In one embodiment, the search system uses the keyword attribute for the primary index and the location attribute for the secondary index to map keywords and locations to their associated web pages. The search system thus creates one primary, keyword index containing an entry for each value of a keyword and creates a secondary, location index for each value of a keyword. The search system sets the entries of the keyword index to reference the corresponding location index. The search system adds an entry to a location index for each value of the location attribute that is associated with at least one web page that is associated with the value of the keyword attribute associated with the location index. The search system sets each entry of a location index to reference the corresponding web pages. For example, a web page may have the keywords of "restaurant" and "Chinese" and the locations of "Redmond" and "Washington." The search system creates a keyword index that contains an entry for the values "restaurant" and "Chinese," which each point to a different location index. The location index associated with the "restaurant" keyword has an entry for the locations of "Redmond" and "Washington," and the location index associated with the location of "Chinese" also has an entry for the locations of "Redmond" and "Washington." If another web page has a keyword of "restaurant" and a location of "Seattle," then the location index associated with the "restaurant" keyword would have an entry corresponding to the location of "Seattle." Each entry of a location index for a keyword identifies the objects having that keyword and location as attributes. When the primary index is the keyword index, the search system searches by first locating the entry for the query term in the keyword index and then retrieving the reference to the associated location index. The search system then searches for the query location in the referenced location index and uses the associated web pages as the query result.

FIG. 1 is a block diagram that illustrates a hybrid index with a keyword index as the primary index in one embodiment. A hybrid index 100 includes a keyword index 101 with an entry for each keyword. Each entry for a keyword includes a reference to a location index 102-104. In one embodiment, the search system implements the location indexes using an R*-tree data structure. The search system may alternatively use other types of data structures such as an R-tree data structure, a B+-tree data structure, a hash-based data structure, and so on. An R*-tree data structure is described in Beckman, N., Kriegel, H., Schneider, R., and Seeger, B., "The R*-tree: An Efficient and Robust Access Method for Points and Rectangles," ACM, May 1990, pp. 322-331, which is hereby incorporated by reference. The search system may implement a keyword index as an inverted file data structure such as a hash table, a prefix table, and so on. Each location index has an entry for each location for which at least one web page has the corresponding keyword. Each entry (i.e., leaf node) has a reference to the corresponding web pages. In this example, location index 102 has entries that point to web page lists 105-107, location index 103 has entries that point to web page lists 108-109, and location index 104 has an entry that points to web page list 110.

In one embodiment, the search system uses the location attribute for the primary index and the keyword attribute for the secondary index to map keywords and locations to their associated web pages. The search system thus creates one primary, location index containing an entry for each value of a location and creates a secondary, keyword index for each value of a location. The search system sets the entries of the location index to reference the corresponding keyword index. The search system adds an entry to a keyword index for each value of the keyword attribute that is associated with at least one web page that is associated with the value of the location attribute associated with the keyword index. The search system sets each entry of a keyword index to reference the corresponding web pages. For example, a web page may have the keywords of "restaurant" and "Chinese" and the locations of "Redmond" and "Washington." The search system creates a location index that contains an entry for the locations of "Redmond" and "Washington," which each point to a different keyword index. The keyword index associated with the location of "Redmond" has entries for the keywords "restaurant" and "Chinese," and the keyword index associated with the location "Washington" also has entries for the keywords "restaurant" and "Chinese." If another web page has the location of "Washington" and the keyword of "fast-food," then the keyword index associated with the location of "Washington" would have an entry corresponding to the keyword "fast-food." Each entry of a keyword index for a location identifies the objects having that keyword and location as attributes. When the location index is the primary index, the search system searches by first locating the entry for the query location in the location index and then retrieving the reference to the associated keyword index. The search system then searches for the query term in the referenced keyword index and uses the associated web pages as the search result.

Figure 2:
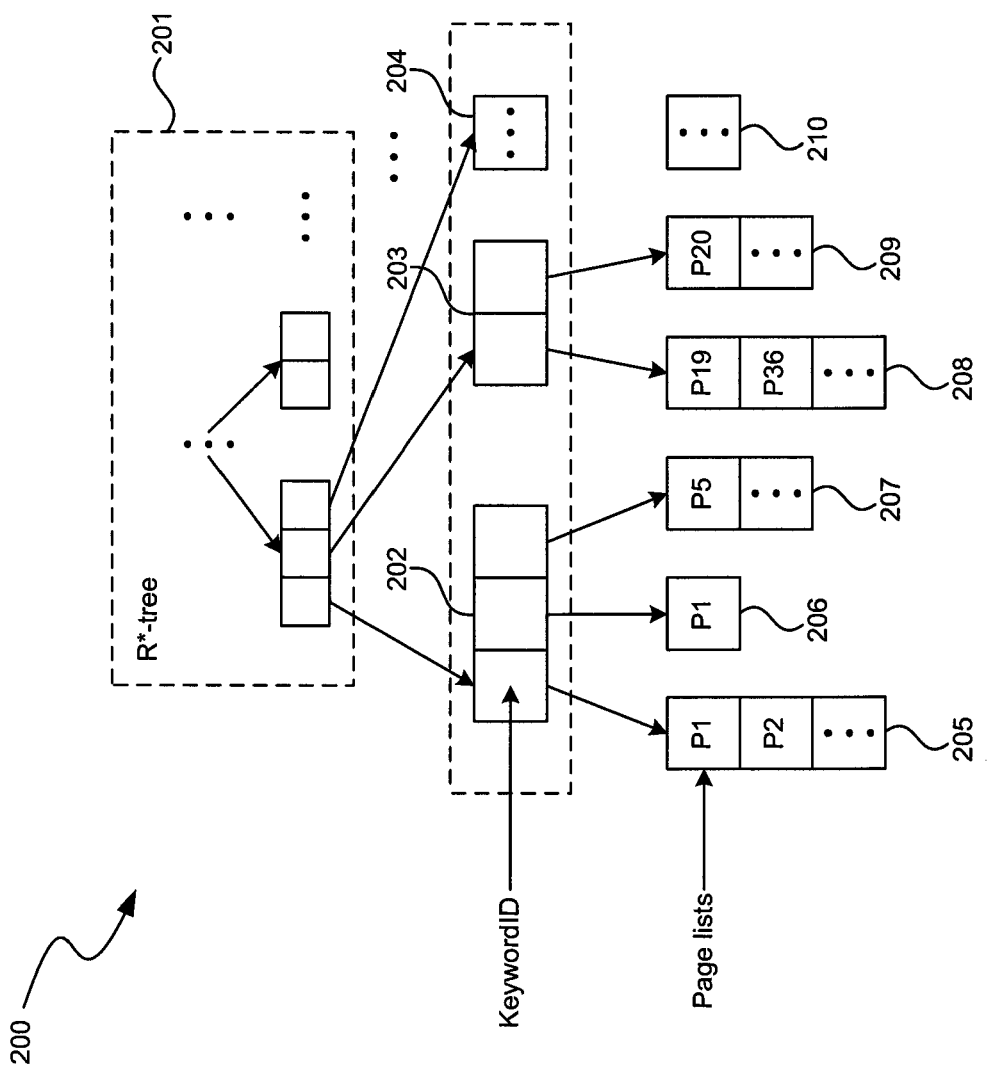
FIG. 2 is a block diagram that illustrates a hybrid index with a location index as the primary index in one embodiment.

FIG. 2 is a block diagram that illustrates a hybrid index with a location index as the primary index in one embodiment. A hybrid index 200 includes a location index 201 with an entry for each location. Each entry for a location includes a reference to a keyword index 202-204. Each keyword index has an entry for each keyword for which at least one web page has the corresponding location. Each entry (i.e., leaf node) has a reference to the corresponding web pages. In this example, keyword index 202 has entries that point to web page lists 205-207, keyword index 203 has entries that point to web page lists 208-209, and keyword index 204 has an entry that points to web page list 210.

Figure 3:
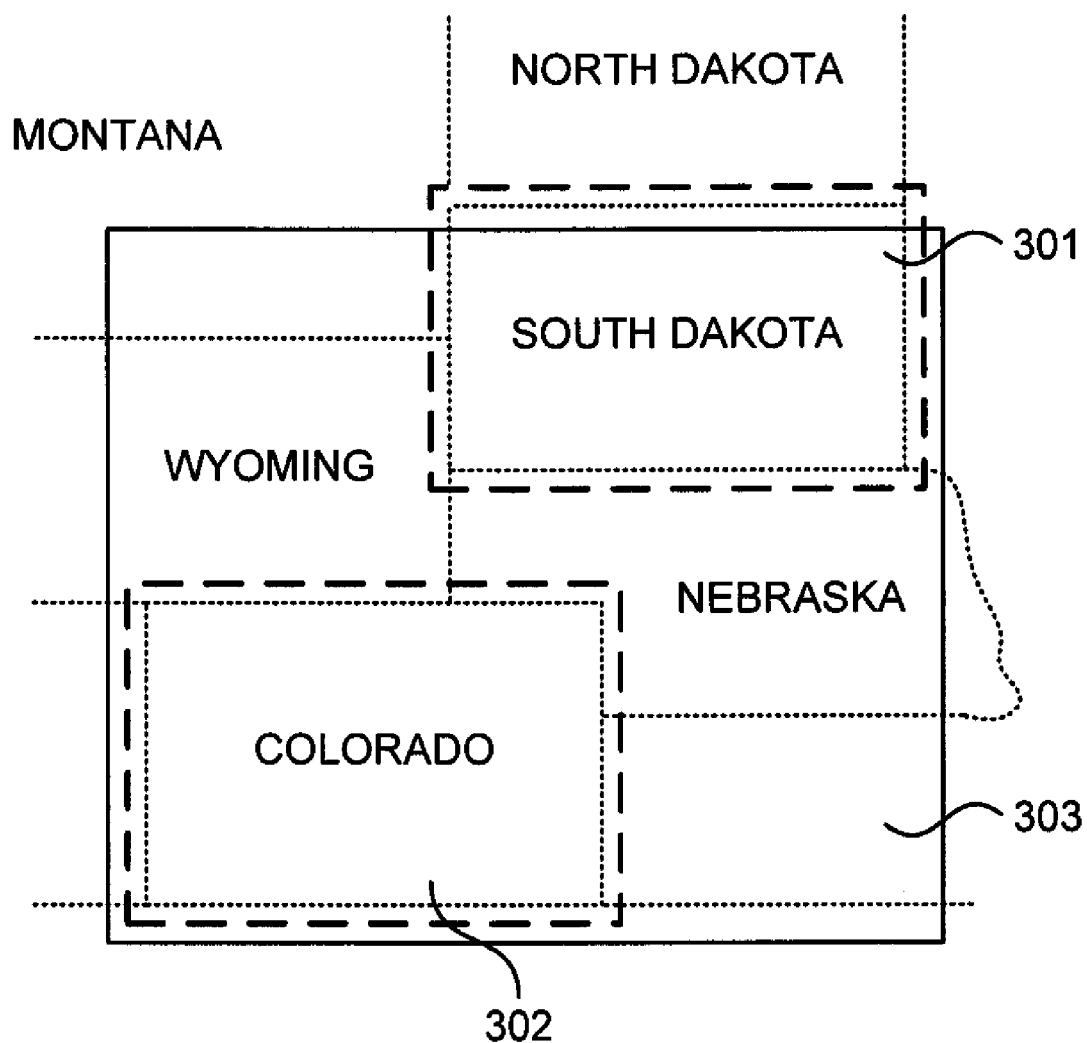
FIG. 3 is a diagram that illustrates a vector-based location representation in one embodiment.

FIG. 3 is a diagram that illustrates a vector-based location representation in one embodiment. A vector-based location representation represents locations using points, lines, and polygons. A raster-based model, in contrast, represents locations using cells of a continuous grid. The search system represents each location of a web page as a rectangular area identified by the coordinates of diagonal corners. Some prior techniques assign a single location to each web page by taking the minimum bounding rectangle of all the individual locations of the web page. For example, if a web page has the locations of "South Dakota" and "Colorado," the prior techniques would represent the single location for the web page as the minimum bounding rectangle 303 for the areas 301 and 302. The search system, in contrast, represents each location individually. Thus, the search system would represent the locations for the web page as the areas 301 and 302.

Figure 4:
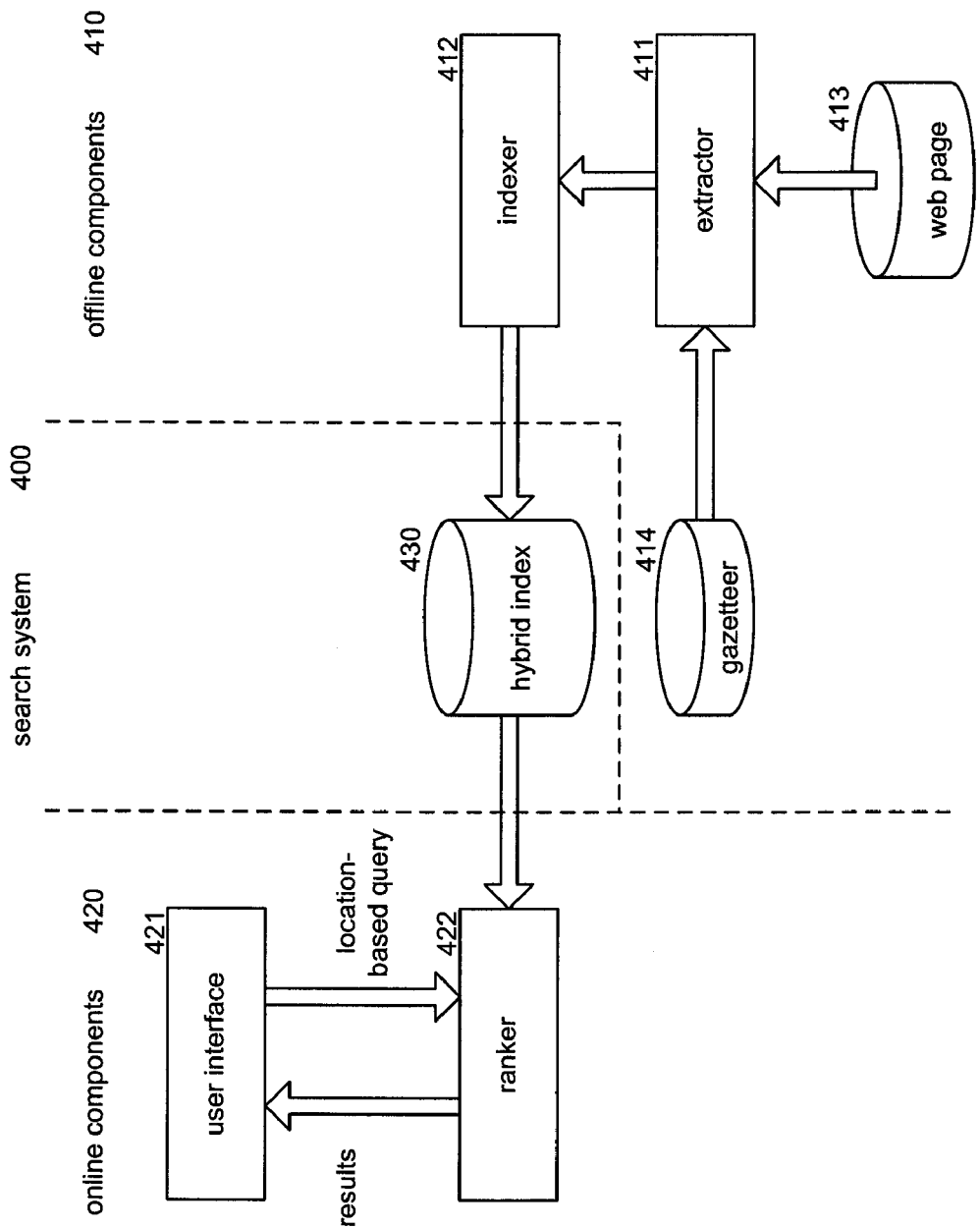
FIG. 4 is a block diagram that illustrates components of the search system in one embodiment.

FIG. 4 is a block diagram that illustrates components of the search system in one embodiment. The search system 400 includes offline components 410, online components 420, and a hybrid index 430. The offline components include an extractor 411 and an indexer 412 along with a web page store 413 and a gazetteer 414. The offline component generates the hybrid index, and the online component performs location-based searches using the hybrid index. The web page store contains references to web pages that have been located by a crawler that may be a conventional search engine crawler. The crawler may have previously located the web pages or may locate the web pages concurrently as the offline component generates the hybrid index. The gazetteer is a geographic index that maps location names to rectangular areas. In one embodiment, the search system generates the gazetteer by identifying the area of each location name using a service such as Microsoft MapPoint that provides longitude/latitude coordinates for each location name. Since the identified areas are not rectangular, the search system applies a Gauss-Kruger reference frame to transform the coordinates. Thus, the gazetteer maps location names to minimum bounding rectangles based on Gauss-Kruger coordinates. The extractor extracts the keywords and location names of each web page. The extractor uses the gazetteer to identify the locations associated with the location names. The extractor creates a mapping of web pages to the corresponding keywords and web pages to the corresponding locations and provides the mappings to the indexer. The indexer inputs the mappings and generates a hybrid index. Assuming that the primary index is the location index, then the indexer creates an R*-tree data structure that contains an entry (i.e., leaf node) for each location and creates a keyword index for each location. The indexer sets each entry of the location index to point to the corresponding keyword index. For each location, the indexer identifies the web pages that are associated with that location and adds an entry to the corresponding keyword index for each keyword of those web pages. Each entry of the keyword index contains a reference to a page list that identifies each of the web pages that contains that keyword.

The online components of the search system include a user interface 421 and a ranker 422. The user interface component inputs a query that contains query terms and a query location. The query location may be specified in various ways. For example, a query location may correspond to the location of the device through which the query is being submitted, a location name entered by the user, a location area identified on a map by a user, and so on. The query may also include advanced spatial conditions such as nearby or contained in. The user interface inputs the location-based query and submits it to the ranker. The ranker uses the hybrid index to identify the web pages of the search result. The ranker converts location names to locations using the gazetteer. Assuming that the primary index is a location index, the ranker locates the entry of the location index corresponding to the query location. The ranker then searches the keyword index referenced by that located entry to identify the entries for the query terms. The ranker combines the web pages identified by the entries to form the search result. The ranker may rank the web pages uses various ranking techniques such as combining a score based on location relevance and keyword relevance. The ranker may also identify those web pages with location relevance above a certain threshold (and discard the others) and then rank those web pages based on their keyword relevance.

The computing devices on which the search system may be implemented may include a central processing unit, memory, input devices (e.g., keyboard and pointing devices), output devices (e.g., display devices), and storage devices (e.g., disk drives). The memory and storage devices are computer-readable media that may contain instructions that implement the search system and the hybrid index. In addition, the data structures and message structures may be stored or transmitted via a data transmission medium, such as a signal on a communications link. Various communications links may be used, such as the Internet, a local area network, a wide area network, or a point-to-point dial-up connection.

The search system may use various computing systems or devices including personal computers, server computers, multiprocessor systems, microprocessor-based systems, network PCs, minicomputers, mainframe computers, distributed computing environments that include any of the above systems or devices, and the like. The search system may also provide its services to various computing systems such as personal computers, cell phones, personal digital assistants, consumer electronics, home automation devices, and so on.

The search system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments. For example, the online and offline components may be implemented on separate computer systems, and the offline components and the crawler may also be implemented on separate computer systems.

Figure 5:
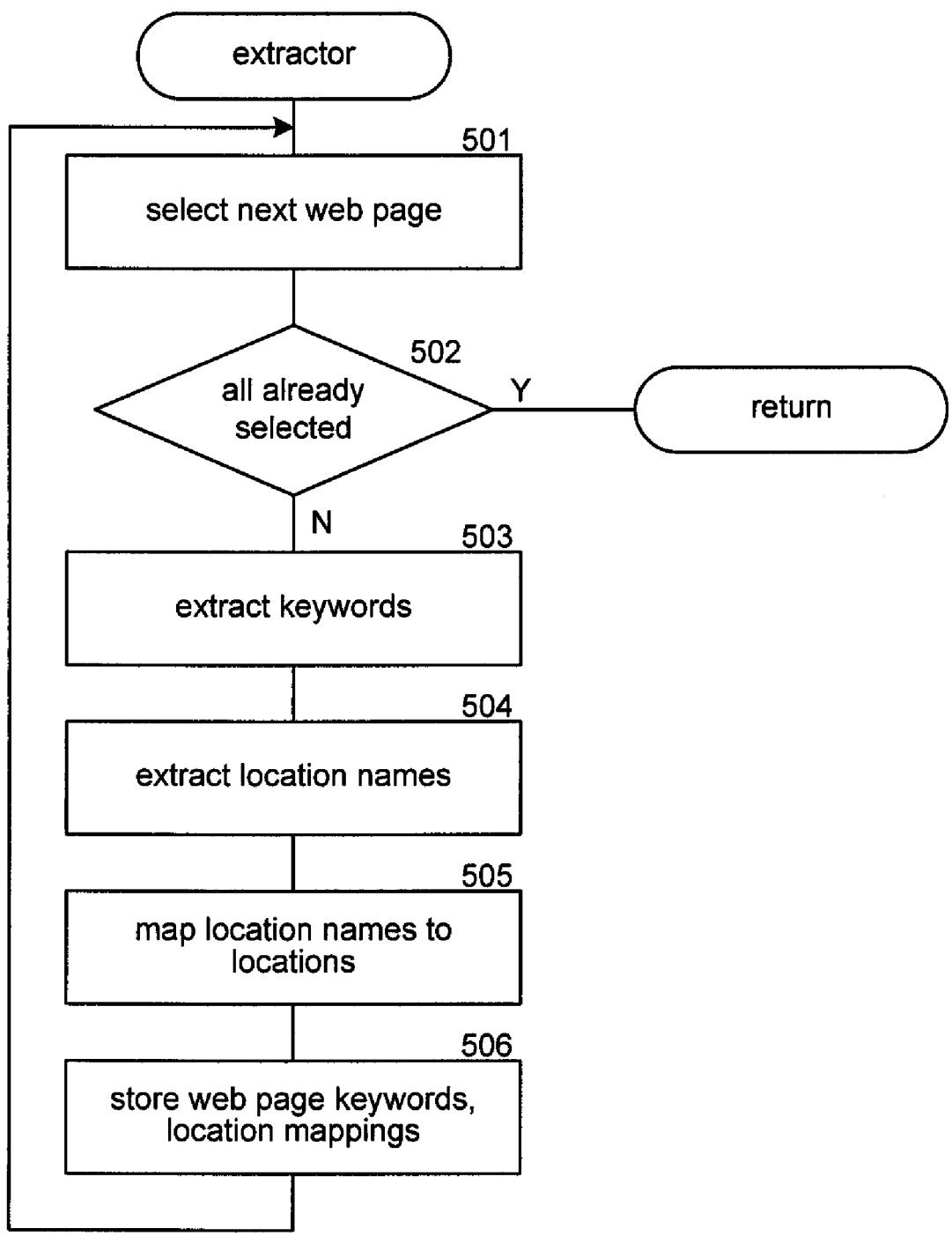
FIG. 5 is a flow diagram that illustrates the processing of the extractor component of the search system in one embodiment.

FIG. 5 is a flow diagram that illustrates the processing of the extractor component of the search system in one embodiment. The component generates mappings between keywords and web pages and locations and web pages. In blocks 501-506, the component loops generating mappings for each web page. In block 501, the component selects the next web page.

In decision block 502, if all the web pages have already been selected, then the component returns, else the component continues at block 503. In block 503, the component extracts the keywords of the selected web page. In block 504, the component extracts the location names of the selected web page. In block 505, the component uses the gazetteer to map the location names to locations. In block 506, the component stores the mappings of keywords and locations to the selected web page and then loops to block 501 to select the next web page.

Figure 6:
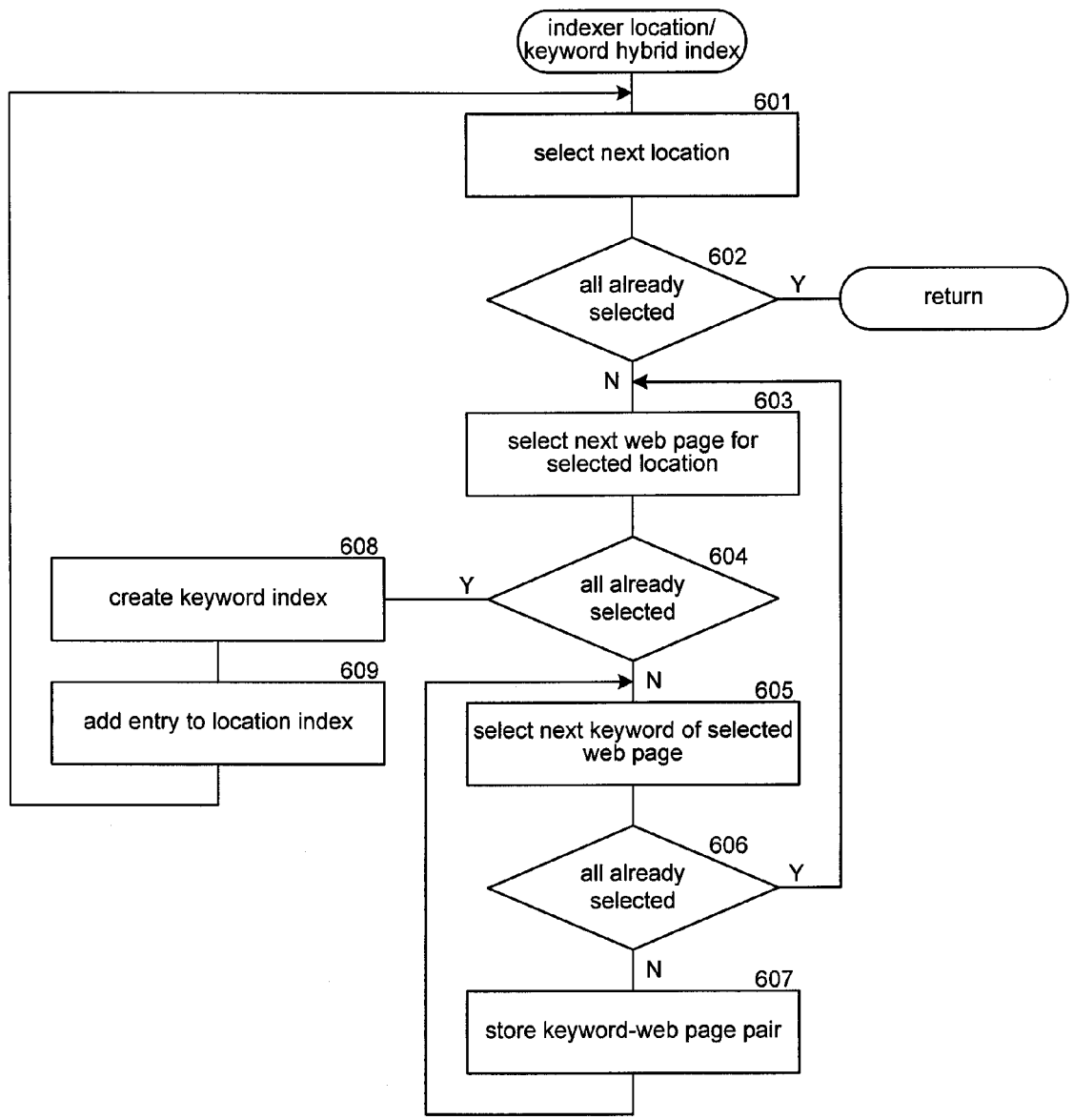
FIG. 6 is a flow diagram that illustrates the processing of a version of the indexer that uses location as the primary index.

FIG. 6 is a flow diagram that illustrates the processing of a version of the indexer that uses location as the primary index. In blocks 601-609, the component loops selecting locations identified by the indexer and adding entries to the location index. In block 601, the component selects the next location. In decision block 602, if all the locations have already been selected, then the component returns, else the component continues at block 603. In blocks 603-607, the component loops populating the keyword index for the selected location. In block 603, the component selects the next web page that is associated with the selected location. In decision block 604, if all web pages have already been selected, then the component continues at block 608, else the component continues at block 605. In blocks 605-607, the component loops identifying the keywords associated with the selected web page. In block 605, the component selects the next keyword of the selected web page. In decision block 606, if all the keywords have already been selected, then the component loops to block 603 to select the next web page, else the component continues at block 607. In block 607, the component stores a keyword and web page pair for use when creating the keyword index and loops to block 605 to select the next keyword. In block 608, the component creates a keyword index using the keyword and web page pairs stored in block 607. In block 609, the component adds an entry to the location index for the selected location that contains a reference to the created keyword index. The component then loops to block 601 to select the next location.

Figure 7:
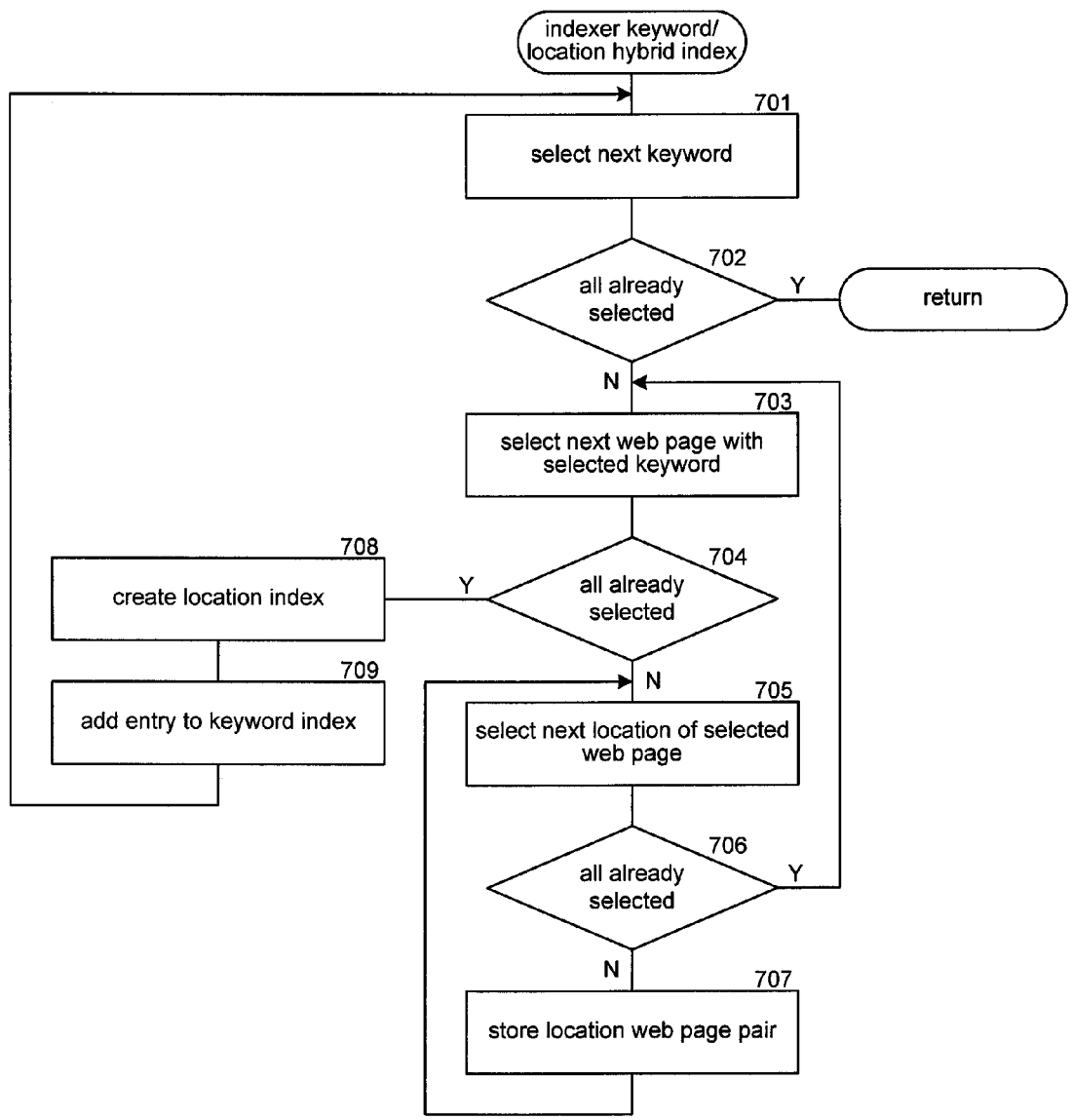
FIG. 7 is a flow diagram that illustrates the processing of a version of the indexer that uses keyword as the primary index.

FIG. 7 is a flow diagram that illustrates the processing of a version of the indexer that uses keyword as the primary index. In blocks 701-709, the component loops selecting keywords identified by the indexer and adding entries to the keyword index. In block 701, the component selects the next keyword. In decision block 702, if all the keywords have already been selected, then the component returns, else the component continues at block 703. In blocks 703-707, the component loops populating the location index for the selected keyword. In block 703, the component selects the next web page that is associated with the selected keyword. In decision block 704, if all web pages have already been selected, then the component continues at block 708, else the component continues at block 705. In blocks 705-707, the component loops identifying the locations associated with the selected web page. In block 705, the component selects the next location of the selected web page. In decision block 706, if all the locations have already been selected, then the component loops to block 703 to select the next web page, else the component continues at block 707. In block 707, the component stores a location and web page pair for use when creating the location index and loops to block 705 to select the next location. In block 708, the component creates a location index using the location and web page pairs stored in block 707. In block 709, the component adds an entry to the keyword index for the selected keyword that contains a reference to the created location index. The component then loops to block 701 to select the next keyword.

Figure 8:
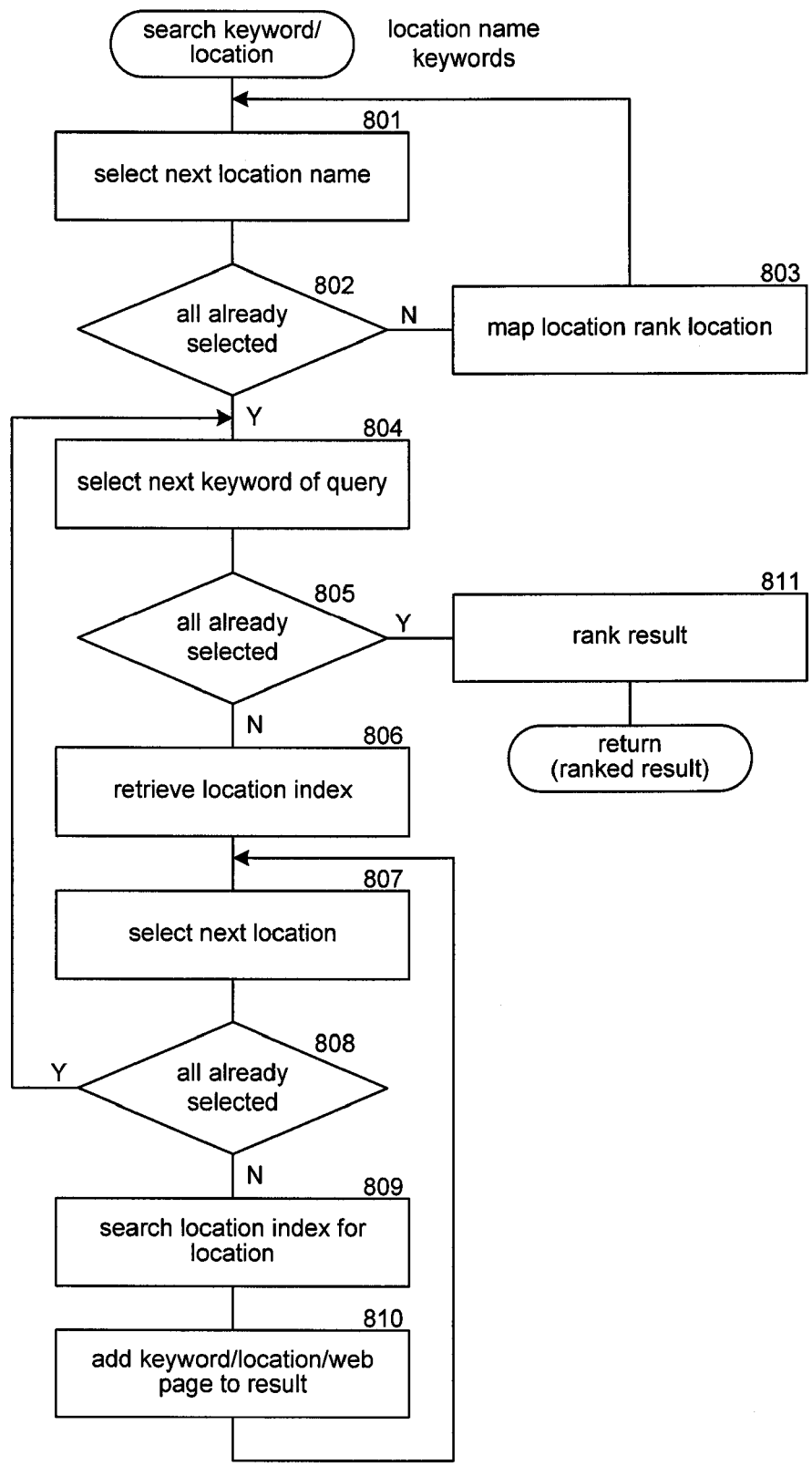
FIG. 8 is a flow diagram that illustrates the processing of a search component of the online components of the search system in one embodiment.

FIG. 8 is a flow diagram that illustrates the processing of a search component of the online components of the search system in one embodiment. The component receives the query terms and query locations of a query and identifies the search result using a hybrid index with a keyword index as the primary index. In blocks 801-803, the component loops mapping location names to locations using the gazetteer. In block 801, the component selects the next location name. In decision block 802, if all the location names have already been selected, then the component continues at block 804, else the component continues at block 803. In block 803, the component maps the location name to the location and then loops to block 801 to select the next location name. In blocks 804-810, the component loops identifying web pages of the search result. In block 804, the component selects the next keyword or term of the query. In decision block 805, if all the keywords or terms of the query have already been selected, then the component continues at block 811, else the component continues at block 806. In block 806, the component searches the keyword index for the selected keyword and identifies the location index. In block 807, the component selects the next location of the query. In decision block 808, if all the locations have already been selected, then the component loops to block 804 to select the next keyword of the query, else the component continues at block 809. In block 809, the component searches the location index for the selected location. In block 810, if an entry corresponding to the selected location was found, then the component adds a keyword/location/web page reference to the search result and then loops to block 807 to select the next location. In block 811, the component ranks the search results and then returns.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. The search system may be used to index and locate various types of objects including web sites, web pages, documents, advertisements, and so on. Accordingly, the invention is not limited except as by the appended claims.

We claim:

1. A computing device for generating an index for indexing objects based on geographic locations and keywords, comprising:
  a central processing unit;
  a memory;
  a component that identifies values of attributes of objects, the attributes including geographic locations and keywords, the geographic locations being rectangular areas represented using vector-based representations associated with objects and an R*-tree-based index of geographic locations;
  a component that generates a hybrid index that indexes objects by geographic locations and keywords, the hybrid index having a primary index that maps each value of a first attribute of the geographic location attribute and the keyword attribute to an associated secondary index that maps values of a second attribute of the geographic location attribute and the keyword attribute to objects that have the indexed value of the first attribute and the indexed value of the second attribute, wherein when the hybrid index maps geographic locations and keywords combinations to objects associated with the combination, wherein when an object is associated with multiple geographic locations, the hybrid index maps to a minimum bounding rectangle of the rectangular areas of the geographic locations;
a component that receives a query that includes a location query value and a keyword query value; and
a component that identifies objects for a search result for the query by using the primary index to identify a secondary index associated with a query value of the query of the first attribute and uses the identified secondary index to identify objects associated with a query value of the query of the second attribute, wherein the identified object have values associated with the location query value and the keyword query value.

2. The computing device of claim 1, wherein the first attribute is keyword and the second attribute is location.

3. The computing device of claim 2, wherein the secondary index is a tree-based location index.

4. The computing device of claim 1, wherein the first attribute is location and the second attribute is keyword.

5. The computing device of claim 4, wherein the primary index is a tree-based location index.

6. The computing device of claim 1, including a component that maps multiple location names of objects to multiple locations for indexing.

7. The computing device of claim 6, wherein the objects are web pages and the location names are derived from content of the web pages.

8. The computing device of claim 1, wherein the objects are web pages, at least one or more of the web pages have multiple locations, the locations of the one or more of the web pages are derived from location names associated with content of the one or more of the web pages and a location index is an R*-tree-based index.

9. The computing device of claim 8, wherein the location index is the primary index.

10. The computing device of claim 8, wherein the location index is the secondary index.

11. A computer-readable storage medium containing computer-executable instructions for controlling a computing device to create a data structure that maps values of geographic location and keyword attributes to objects, the data structure comprising:
a hybrid index having a primary index and secondary indexes, the primary index mapping a value of a first attribute of the geographic location attribute and the keyword attribute to an associated secondary index, each secondary index mapping values of a second attribute of the geographic location attribute and the keyword attribute to objects that have the value of the first attribute associated with the secondary index and the value of the second attribute,
wherein the geographic locations are represented using an R*-tree-based index and the geographic locations are rectangular areas represented using a vector-based representation,
wherein the hybrid index maps geographic location and keyword combinations to objects associated with the combination,
wherein when an object is associated with multiple geographic locations, the hybrid index represents combined geographic locations by a minimum bounding rectangle of the geographic locations, and
wherein the hybrid index identifies objects of a search result of a query having a location query value and a keyword query value, the objects being identified using the primary index to identify a secondary index associated with a query value of the query of the first attribute and using the identified secondary index to identify objects associated with a query value of the query of the second attribute, wherein the identified objects have values associated with the location query value and the keyword query value.

12. The computer-readable storage medium of claim 11, wherein the first attribute is location and the second attribute is keyword.

13. The computer-readable storage medium of claim 11, wherein the first attribute is keyword and the second attribute is location.

14. The computer-readable storage medium of claim 11, wherein the objects are web pages.

15. A computing device for performing a location-based search for web pages based on query values for a geographic location attribute and a keyword attribute, comprising:
a central processing unit;
a memory;
a component that generates a hybrid index having a primary index and secondary indexes, the primary index mapping values of a first attribute of the geographic location attribute and the keyword attribute to associated secondary indexes, each secondary index mapping values of a second attribute of the geographic location attribute and the keyword attribute to web pages that have the value of the first attribute associated with the secondary index and the value of the second attribute, wherein the geographic locations are rectangular areas represented using a vector-based representation and an R*-tree-based index of geographic locations, wherein when the hybrid index maps geographic location and keyword combinations to web pages associated with the combinations, wherein when a web page is associated with multiple geographic locations, the hybrid index maps to a minimum bounding rectangle of the rectangular areas of the geographic locations;
a component that receives from a user a query that includes a location query value and a keyword query value;
a component that uses the primary index to identify a secondary index associated with a query value of the query of the first attribute; and
a component that uses the identified secondary index to identify web pages associated with a query value of the query of the second attribute, wherein the identified web pages have values associated with the location query value and the keyword query value;
wherein the identified web pages represent search results for a search request represented by the received query that includes a location query value and a keyword query value.

16. The computing device of claim 15, wherein the first attribute is location and the second attribute is keyword.

* * * * *